United States Patent
Shonfeld et al.

(10) Patent No.: US 6,662,406 B2
(45) Date of Patent: Dec. 16, 2003

(54) GARDEN TOOLS AND ERGONOMIC HANDLES THEREFOR

(75) Inventors: Richard C. Shonfeld, Brooklyn, NY (US); James J. Best, Weehawken, NJ (US); Daniel J. Formosa, Montvale, NJ (US); Conor P. McNamara, Brooklyn, NY (US); Marco C. Perry, Brooklyn, NY (US)

(73) Assignee: WKI Holding Company, Inc., Reston, VA (US)

( * ) Notice: Subject to any disclaimer, the term of this patent is extended or adjusted under 35 U.S.C. 154(b) by 0 days.

(21) Appl. No.: 09/916,947

(22) Filed: Jul. 27, 2001

(65) Prior Publication Data

US 2002/0020537 A1 Feb. 21, 2002

Related U.S. Application Data

(63) Continuation-in-part of application No. 09/637,654, filed on Aug. 11, 2000, now abandoned.

(51) Int. Cl.[7] .............................. B25G 1/01; B25G 3/00
(52) U.S. Cl. ............................. 16/431; 16/430; 16/436; 16/DIG. 12; 16/DIG. 18; 16/DIG. 19
(58) Field of Search .................. 16/430, 431, 436, 16/421, DIG. 12, DIG. 19; D8/10, 107, 303, 395; 30/335–339, 526, 527; 294/49, 55, 57; 81/177.1, 489; 15/143.1, 144.7, 167.1; 74/543, 551.1, 551.9; 172/371

(56) References Cited

U.S. PATENT DOCUMENTS

| D104,484 S | * | 5/1937 | Weinig ..................... D8/10 |
| 3,340,914 A | * | 9/1967 | Ricks ..................... 16/DIG. 12 |
| 4,481,689 A | * | 11/1984 | Westmoreland ........ 15/236.01 |
| 4,721,021 A | | 1/1988 | Kusznir |
| 4,739,536 A | | 4/1988 | Bandera et al. |
| D318,602 S | * | 7/1991 | Vosbikian ..................... D8/10 |
| 5,390,572 A | | 2/1995 | Gakhar et al. |
| 5,398,369 A | | 3/1995 | Heinzelman et al. |
| 5,440,784 A | | 8/1995 | Hull et al. |
| 5,446,941 A | | 9/1995 | Kelsay |
| D369,072 S | * | 4/1996 | Huang ..................... D8/13 |
| 5,581,845 A | | 12/1996 | Yang |
| 5,624,061 A | | 4/1997 | Gager et al. |

(List continued on next page.)

FOREIGN PATENT DOCUMENTS

| DE | 2634656 | * | 2/1978 |
| DE | 92 04 670 U | | 11/1992 |
| DE | 297 10 510 U | | 8/1997 |
| GB | 2 274 615 A | | 3/1994 |
| GB | 2 362 123 A | | 11/2001 |

*Primary Examiner*—Chuck Y. Mah
(74) *Attorney, Agent, or Firm*—Seyfarth Shaw LLP (57) ABSTRACT

A garden tool includes a work-engaging head joined by a shank to a plastic handle. The handle has a relatively rigid plastic core body. A cavity is formed in the handle to divide it into forward and rearward portions. The cavity is filled with a flexible and resilient material to accommodate flexing of the rearward portion relative to the forward portion. A flexible and resilient gripping sheath covers the outer surface of the core body except for the cavity. In one embodiment the cavity is in the core body and includes a notch. For digging tools, such as trowels, the notch is formed on the lower side of the core body adjacent to the distal end, while for pulling or raking tools, such as plows, the notch is formed on the upper side of the core body adjacent to the working end. A recess may be formed in the core body opposite the notch for cooperation with the notch to define a narrow hinge. In another embodiment the cavity includes an aperture extending laterally through a lobe extension of the grip sheath, and in yet in another embodiment the cavity includes notches formed on upper and lower sides of the core body and defined by a hinge interconnecting the forward and rearward portions of the handle.

36 Claims, 5 Drawing Sheets

U.S. PATENT DOCUMENTS

| | | | |
|---|---|---|---|
| D383,049 S | * 9/1997 | Concari et al. | D8/10 |
| 5,692,265 A | 12/1997 | Dalury | |
| 5,722,116 A | 3/1998 | Lin | |
| 5,740,586 A | 4/1998 | Gomas | |
| 5,758,383 A | * 6/1998 | Hohlbein | 15/167.1 |
| 5,781,963 A | 7/1998 | Maru et al. | |
| 5,799,369 A | 9/1998 | Schülein | |
| 5,816,337 A | 10/1998 | Kun-Chuan | |
| 5,829,099 A | 11/1998 | Kopelman et al. | |
| 5,850,663 A | * 12/1998 | Hardy et al. | 15/143.1 |
| 5,956,799 A | 9/1999 | Panaccione et al. | |
| 5,975,601 A | 11/1999 | Spear et al. | |
| 5,979,015 A | 11/1999 | Tamaribuchi | |
| 6,006,393 A | 12/1999 | Lynch et al. | |
| 6,027,153 A | 2/2000 | Marshall | |
| D424,399 S | 5/2000 | Staton | |
| 6,065,188 A | * 5/2000 | Wold et al. | 16/430 |
| D427,030 S | * 6/2000 | Wen | D8/107 |
| 6,070,301 A | 6/2000 | Fallandy | |
| 6,070,329 A | 6/2000 | Gibbs | |
| 6,213,055 B1 | * 4/2001 | Willinger et al. | 119/633 |

* cited by examiner

GARDEN TOOLS AND ERGONOMIC HANDLES THEREFOR

RELATED APPLICATION

This application is a continuation-in-part of U.S. application Ser. No. 09/637,654 filed Aug. 11, 2000 now abandoned and entitled "Garden Tools and Ergonomic Handles Therefor."

BACKGROUND

This application relates to tools and tool handles, and has particular application to garden tools and ergonomic handles therefor.

There are a variety of different types of tools designed for use in gardening. Some such tools have relatively long handles and are designed for being manipulated by both of the user's hands, while other tools have relatively short handles designed to be grasped and manipulated by a single hand. This application relates principally to the latter type of tools, although principles disclosed herein may also be applicable to longer-handled tools.

Garden tools include two basic types of tools, viz., those which are designed for digging and require a pushing motion on the handle, and those which are designed for pulling or raking action and require a combination of pulling motion to pull the tool toward the user and a tilting motion to keep the point of the tool forced downwardly into the earth. The former type of tools may include such tools as trowels, scoops, forks, weeders and the like, while the latter type of tool may include such tools as rakes, plows, cultivators and the like.

Heretofore, various types of handles have been provided for hand tools, including garden tools, many of these handles being ergonomically designed to cushion the user's hand and/or to provide improved or specialized gripping surfaces. However, prior tool handles have not generally distinguished between the different types of action and forces required by different types of tools. Furthermore, some prior ergonomic handles have relatively complex and expensive construction.

SUMMARY

This application is directed to improved garden tools and ergonomic handles therefor which avoid the disadvantages of prior tools and handles while affording additional structural and operating advantage.

An important aspect is the provision of a tool handle which is specially designed for the type of user action required by the tool.

In connection with the foregoing aspect, another aspect is the provision of a handle which permits flexing of one portion of the handle with respect to another without affecting the rigidity and strength of the individual handle portions.

Another aspect is the provision of a handle of the type set forth, which can be simply and economically formed by molding.

A still further aspect is the provision of garden tools incorporating handles of the type set forth.

Certain ones of these and other aspects may be obtained by providing a tool handle comprising of a core body having a cavity formed therein and dividing the core body into first and second portions, and a flexible and resilient body of relatively soft material filling the cavity and secured to the core body for accommodating flexing of the first portion relative to the second portion.

Other aspects by be obtained by providing a handle of the type set forth, with a flexible and resilient gripping sheath covering the core body except for the cavity.

Still other aspects may be obtained by providing a garden tool including a head, a shank, and a handle of the type set forth connected to the shank.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Referring to FIGS. 1–4, there is illustrated a garden tool, generally designated by the numeral 10, which has a head 11, in the nature of a trowel, coupled by a shank 20 to a handle 30. The bead 11 may be formed of a suitable metal and includes a blade 12 having a trough-like, tapered shape, including a rear edge 13 which has a beveled notch 14 formed therein to form a sharp edge for cutting string, twine or the like. The blade 12 has a pair of side edges 15, each having a serration 16 thereon, the side edges 15 converging from the opposite ends of the rear edge 13 to a point 17 to facilitate digging in the earth. The serrated edges 16 may be useful for cutting through small roots, chopping tough soil, cutting open bags of soil and the like.

Figure 1:
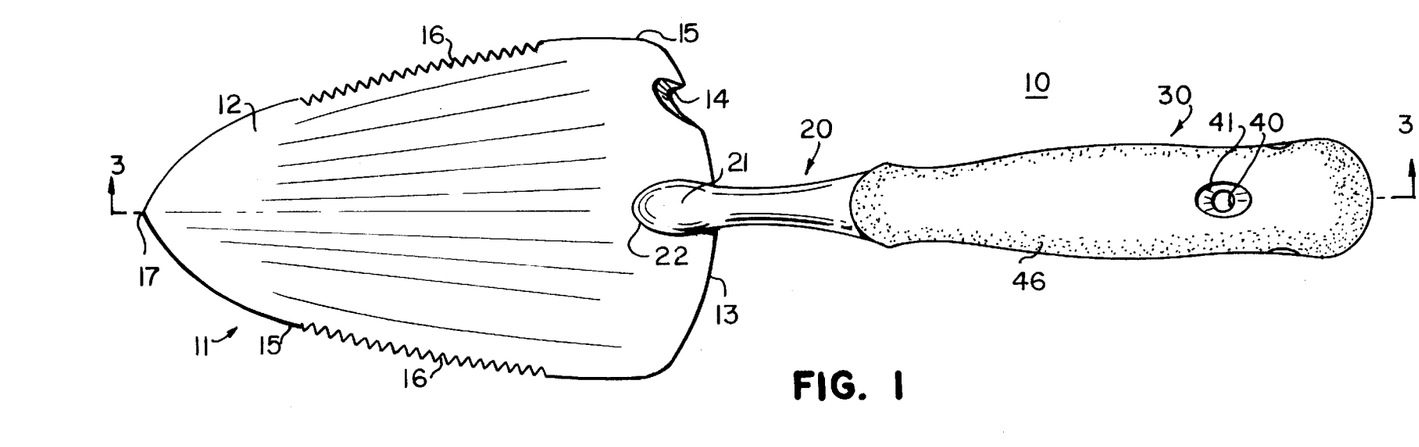
FIG. 1 is a top plan view of a first embodiment of garden tool.
Figure 2:
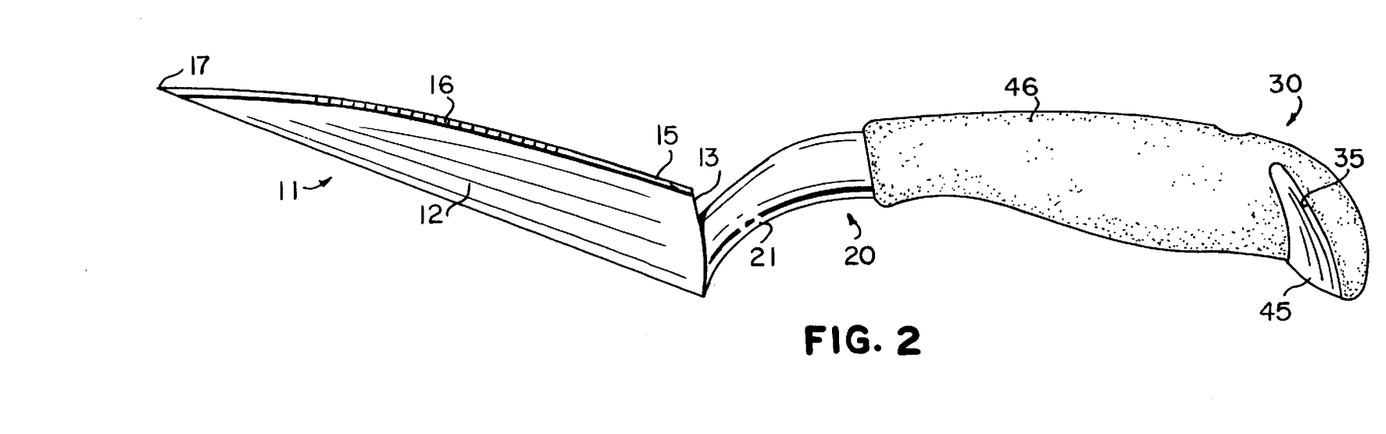
FIG. 2 is a side elevational view of the tool of FIG. 1.
Figure 3:
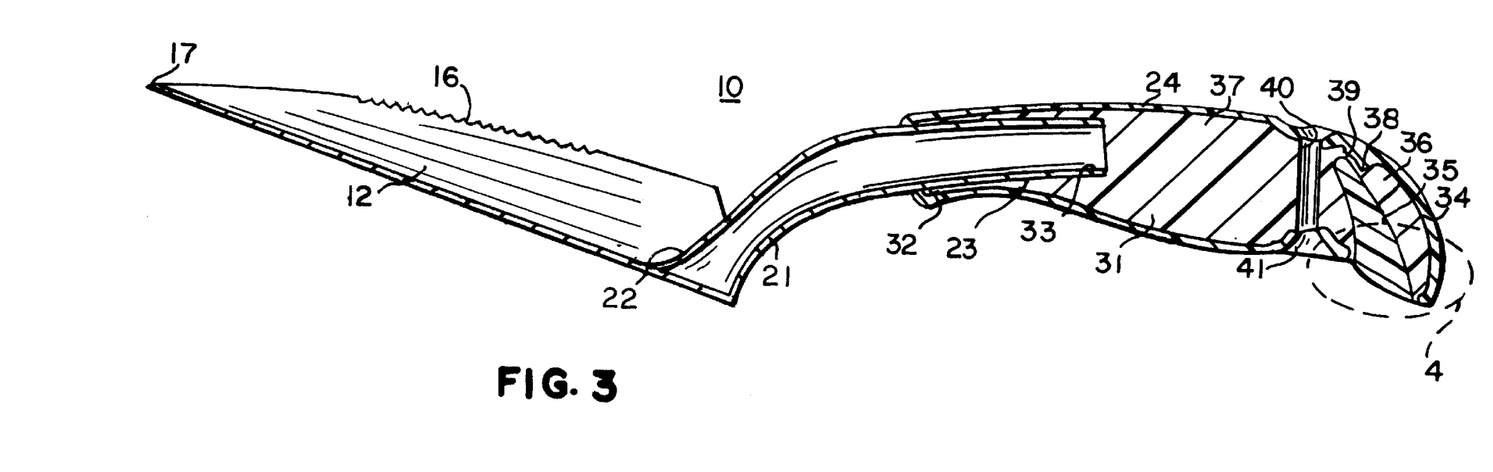
FIG. 3 is a sectional view taken generally along the line 3–3 in FIG. 1.

The shank 20 is a hollow tubular body, which may be formed of a suitable metal, and has a neck 21 terminating at a proximal end 22, which is fixedly secured to the blade 12 centrally along the upper surface thereof adjacent to the rear edge 13 by any suitable means. Alternatively, the blade 12 and shank 20 may be formed as a single piece. The neck 21 is curved and joins a coupling portion 23 of the shank 20 which terminates in a distal and 24.

The handle 30 has an elongated, relatively rigid core body 31, which may be formed of a suitable plastic, such as polypropylene. The core body 31 has a relatively thin working end 32 having a cylindrical bore 33 formed axially therein, the core body 31 also having a relatively thick distal end 34. Formed in the lower side of the core body 31 adjacent to the distal end 34 is a cavity in the form of a notch 35, which is generally V-shaped in transverse cross section, tapering from a relatively wide outer end to a relatively narrow inner end and serving to divide the core body 31 into a rearward portion 36 and a forward portion 37. Formed in the core body 31 immediately above the inner end of the notch 35 is a shallow recess 38, which cooperates with the notch 35 to define therebetween a relatively thin hinge neck 39, which permits flexing of the rearward portion 36 relative to the forward portion 37 of the core body 31. Formed through the core body 31 from the upper side to the lower side thereof is a cylindrical hole 40 having counterbores 41 at its opposite ends to facilitate hanging the tool 10. Extending laterally outwardly from the core body 31 around the periphery of the outer end of the notch 35 is a thin shoulder or lip 42 (see FIG. 4).

Figure 4:
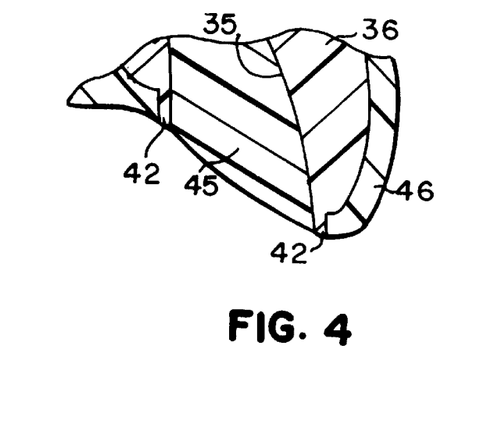
FIG. 4 is an enlarged, fragmentary, sectional view of the circled portion of the tool handle designated 4 in FIG. 3.

The notch 35 is filled with a flexible and resilient body 45, which is fixedly secured to the core body 31 and may be formed of a relatively soft material, such as a thermoplastic elastomer, although other materials could be used. The outer surface of the core body 31, except for the cylindrical part of the hole 40 and the notch 35, is covered with a grip sheath 46 of cushioning, flexible and resilient material, which may be a thermoplastic elastomer of the type sold under the trade name SANTOPRENE, although other materials could be used. The body 45 is preferably of a softer durometer than the sheath 46.

The handle 30 may be formed by molding, the core body 31 being initially molded, with the flexible and resilient body 45 then being added in a first overmolding step and the sheath 46 then being added in a second overmolding step. In the latter steps, it will be appreciated that suitable fixtures fill the bore 33 and the hole 40 to prevent the thermoplastic elastomer, materials from entering therein. The sheath material is stopped by the lip 42, so that it does not come in contact with the flexible and resilient body 45, since such contact during the sheath molding process might tend to melt the previously molded and set flexible and resilient body 45.

In assembly, the coupling portion 23 of the shank 20 is inserted into the bore 23 and fixedly secured therein by suitable means. For example, it could be secured by a suitable adhesive, or, alternatively, the parts could be dimensioned so the shank is press fit in the bore 23. However, these techniques are simply by way of illustration, and it will be appreciated that other techniques could be used for coupling the shank 21 to the handle 30.

In use, the user's hand grips the handle 30, typically with the palm on the top of the handle 30 and the fingers wrapped around the bottom. For digging operations, particularly in relatively hard or dense soil, it is frequently necessary for the user to apply pressure to the rear end of the handle, such as with the heel of the user's hand. This action is cushioned by the flexing of the rearward portion 36 toward the forward portion 37, this flexing movement being accommodated by and being cushioned by the flexible and resilient body 45 which may serve as a shock absorber.

Referring now to FIGS. 5–8, there is illustrated another embodiment of garden tool, generally designated by the numeral 50, which includes a head 51 which may be in the form of a plow. The head 51 may be formed of a suitable metal and has a blade 52 with a rear or upper edge 53, in which may be formed a beveled-edge notch 54 to provide a sharp cutting edge for twine or the like. The blade 52 has a pair of side edges 55 which slope from the opposite ends of the rear edge 53 to a point 57. It will be appreciated that either or both of the side edges 55 may be provided with serrations (not shown) like the serrations 16 of FIG. 1. The blade 52 defines two part-cylindrical halves 58 joined by an arcuate center ridge 59, all in a known manner.

Figures 7, 8:
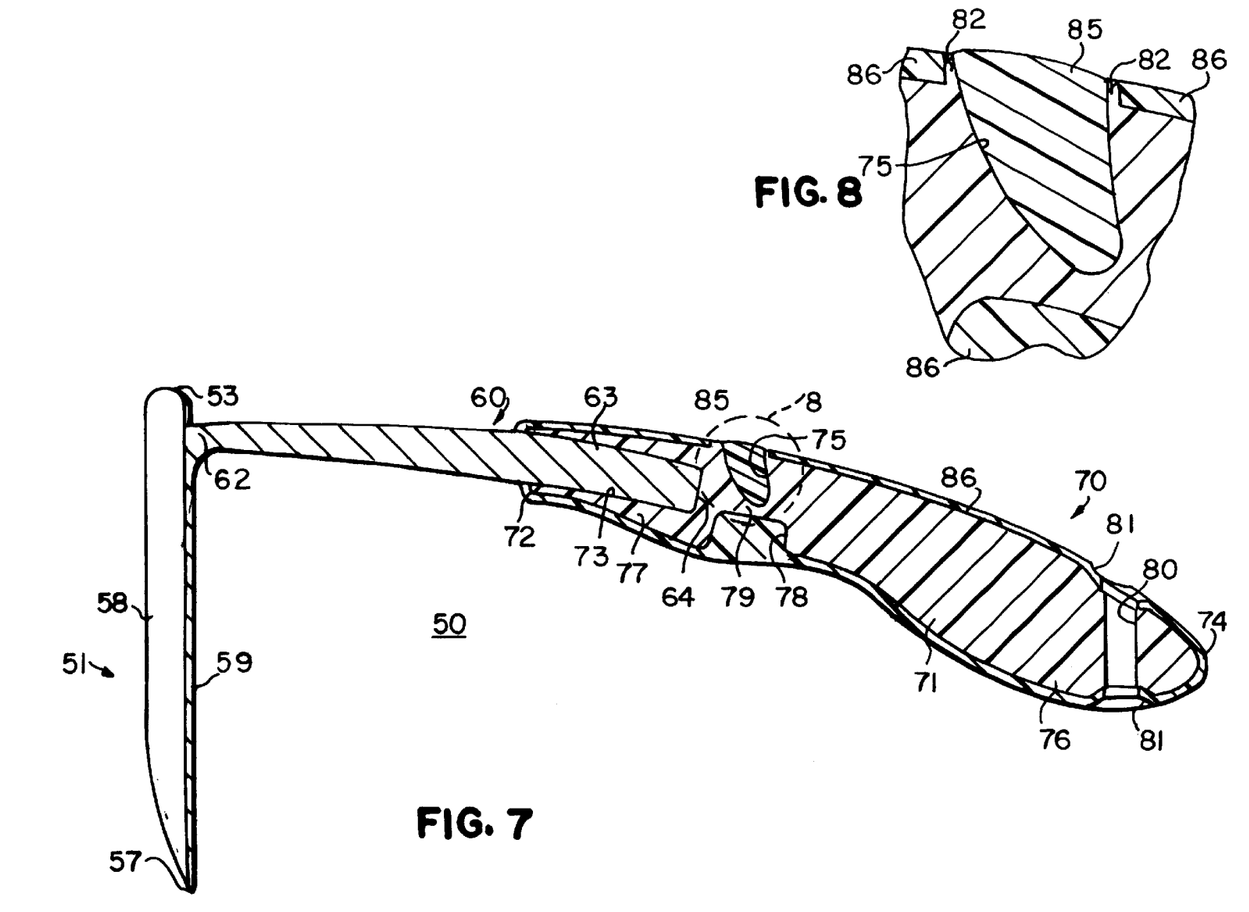
FIG. 7 is a sectional view taken generally along the line 7—7 in FIG. 5.
FIG. 8 is an enlarged, fragmentary, sectional view of the circled portion of the handle designated 8 in FIG. 7.
Figure 9:
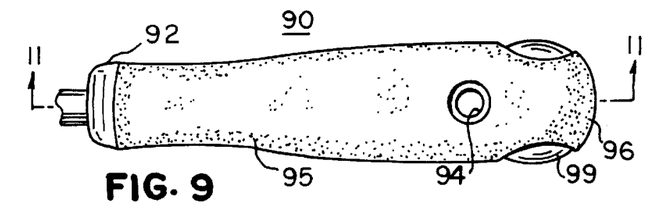
FIG. 9 is a top plan view of another embodiment of garden tool handle.
Figure 10:
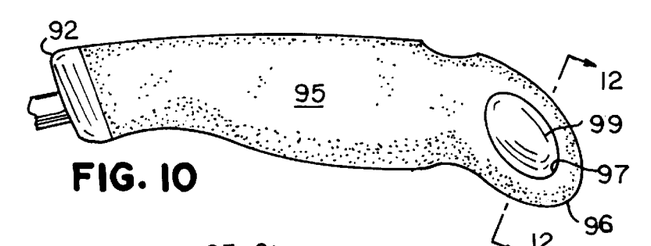
FIG. 10 is a side elevational view of the handle of FIG. 9.
Figure 11:
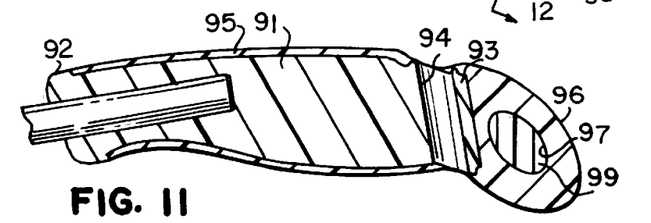
FIG. 11 is a sectional view taken along the line 11—11 in FIG. 9.
Figure 12:
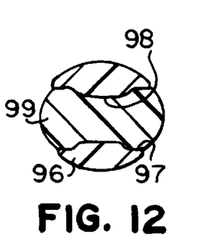
FIG. 12 is a sectional view taken generally along the line 12—12 in FIG. 10.

The tool 50 includes a solid shank 60, which is generally cylindrical in shape and may be formed of a suitable metal. The shank 60 has a proximal end 62 which may be secured to, or formed unitarily with, the blade 52, centrally of the rear or upper edge 53. Referring particularly to FIGS. 7 and 8, the shank 60 has a coupling portion 63 terminating in a distal end 64.

The shank 60 is coupled to a handle 70, which has an elongated, relatively rigid core body 71 extending from a relatively thin forward working end 72 to a rearward distal end 74. Formed in the upper side of the core body 71, adjacent to the working end 72 thereof, is a cavity in the form of a notch 75 which is generally V-shaped in transverse cross section, tapering from a relatively wide outer end to a relatively narrow inner end, and serving to divide the core body 71 into a rearward portion 76 and a forward portion 77. Formed in the lower side of the core body 71 immediately beneath the notch 75 is a recess 78, which cooperates with the notch 75 to form a relatively narrow hinge neck 79 to accommodate pivotal movement of the rearward portion 76 upwardly and forwardly relative to the forward portion 77 of the core body 71. Formed through the core body 71 from the upper side to the lower side thereof adjacent to the distal end 74 thereof is a circularly cylindrical hole 80 having counterbores 81, respectively at its opposite ends. Extending laterally outwardly from the core body 71 around the outer periphery of the notch 75 is a thin shoulder or lip 82 (see FIG. 8). A flexible and resilient body of relatively soft material 85 fills the notch 75 and is fixedly secured to the core body 71. A flexible and resilient grip sheath 86 covers the outer surface of the core body 71, except for the notch 75 and the cylindrical portion of the hole 80.

The materials of the core body 71, the flexible and resilient body 85 and the sheath 86 may, respectively, be the same as those described above for corresponding parts of the tool handle 30, and the handle 70 may be formed in a 3-step molding process similar to that described above for the handle 30. The shank 60 may be assembled with the handle 70 in the same manner as was described above for the tool 10. In either of the embodiments of FIGS. 1–4 or 5–8 the shank may be solid or hollow.

In operation, a user will typically grip the handle 70 with the palm on the upper side of the handle and the fingers wrapping around the lower side for pulling or raking operations. However, when pulling hard or heavy material or for penetrating the point 57 into such material, it may be necessary for the user to perform a tilting operation, wherein the rearward portion 76 of the handle 30 is lifted while the tool blade 52 is being pushed down. This operation will tend to pivot the rearward portion 76 upwardly relative to the forward portion 77, which pivoting movement is accommodated by the hinge neck 79, and is also accommodated and cushioned by the flexible and resilient body 85. In this regard, the notch 75 is disposed closely adjacent to the distal end 64 of the shank 67. The grip sheath 86 provides a cushioned frictional grip for the user's hand.

Referring to FIGS. 9–12, there is illustrated a handle 90 of a type adapted to be connected to the shank of a digging-type tool similar to that shown in FIGS. 1–3. The handle 90 may have a core body 91, which may be formed of a suitable rigid plastic material, such as polypropylene. The core body 91 may have a laterally outwardly extending peripheral flange 92 at the working end thereof and terminates in a distal end 93 in which is formed a generally vertical hanging hole 94. The outer surface of the core body 91, except for the flange 92 and the hanging hole 94, is covered with a grip sheath 95 of cushioning, flexible and resilient material, which may be formed of the same material as the grip sheaths 46 and 86, described above. The portion of the grip sheath 95 covering the distal end 93 of the core body 91 is greatly thickened to define an end lobe 96 of the handle 90, in which is formed a laterally extending aperture 97, which has a reduced-cross section central portion 98 and is filled with a body 99 of flexible and resilient gel-like material.

The handle 90 is used in a manner similar to the handle 30 described above. Pressure applied to the lobe 96 of the handle 90 by the user's hand in digging operations is cushioned by the flexing of the lobe 96, this flexing movement being accommodated by and being cushioned by the flexible and resilient gel body 99 which may serve as a shock absorber.

Figure 5:
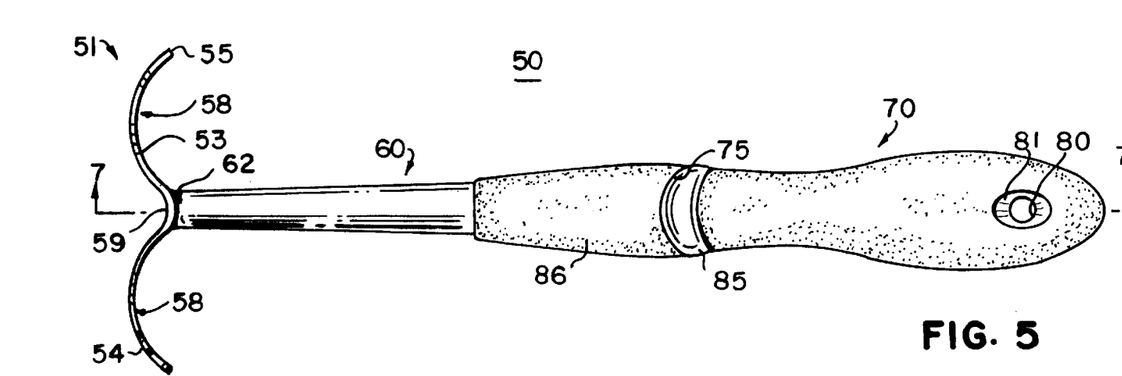
FIG. 5 is a top plan view of another embodiment of garden tool.
Figure 6:
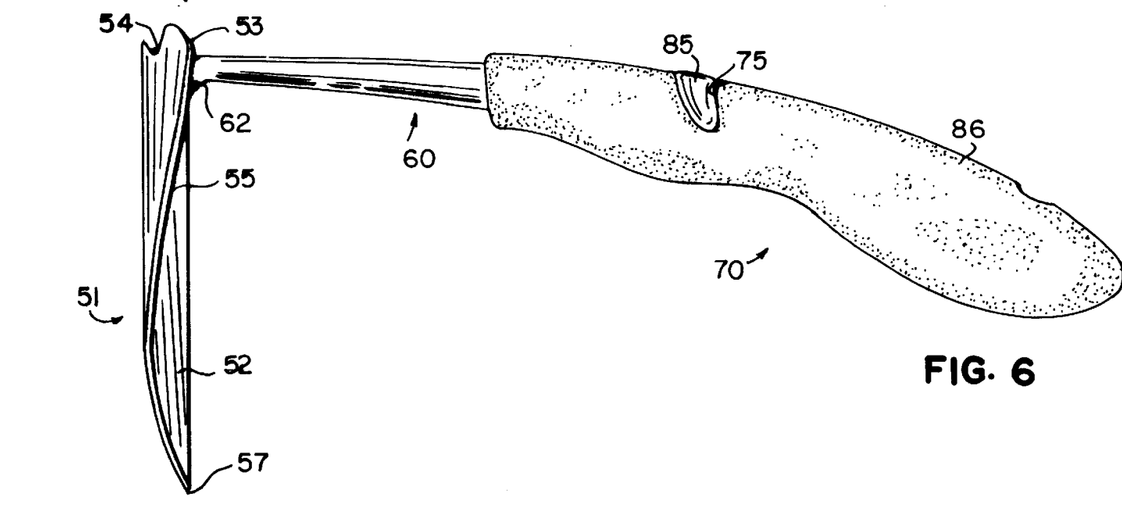
FIG. 6 is a side elevational view of the tool of FIG. 5.
Figure 13:
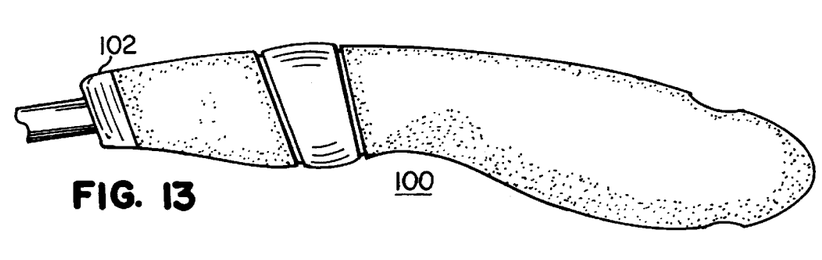
FIG. 13 is a side elevational view of still another embodiment of garden tool handle.
Figure 14:
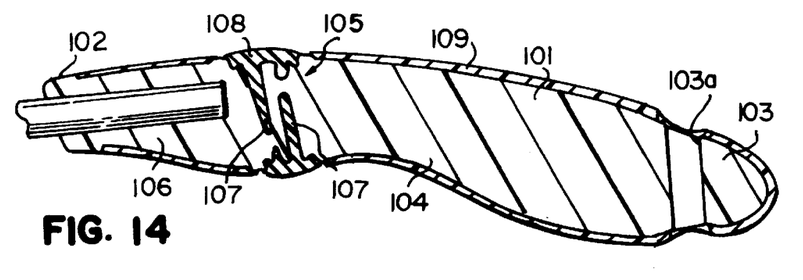
FIG. 14 is a longitudinal sectional view of the handle of FIG. 13.

Referring now to FIGS. 13 and 14, there is illustrated a handle 100 which may be used with either digging tools like that of FIGS. 1–3 or pulling tools like that of FIGS. 5–7. The handle 100 has a rigid core body 101 formed of a suitable plastic material and adapted to be fixedly secured by suitable means to the shank of the tool head. The handle 100 may be provided with a laterally outwardly extending peripheral end flange 102 at its working end and terminates at a distal end 103, in which is formed a generally vertical hanging hole 103a. The core body 101 has a rearward portion 104 which is connected by a hinge 105 to a forward portion 106, the hinge 105 having a folded construction, with the folds defining a cavity including generally V-shaped notches 107 on the upper and lower sides of the hinge. These notches are filled with a flexible and resilient body 108 formed of a suitable flexible and resilient material, which may be the same material as that of the body 99 of the handle 90, described above, and may be clear or translucent so that the hinge 105 is visible therethrough. The body 108 defines a ring of material between the forward and rearward portions 106 and 104. The outer surface of the core body 101, except for the hanging hole 103a, hinge 105, and narrow strips just forward and rearward of the hinge 105, is covered with a grip sheath 109 of cushioning, flexible and resilient material, which may be the same type of material as used in the grip sheaths described above.

The body 101 has an external shape which has thin portions at the working and distal ends thereof and approximately midway therebetween, the middle thin portion being spaced from the end thin portions, respectively, by forward and rearward thick portions, so that the thickness of the body gradually decreases from each thick portion to each of the adjacent thin portions.

If the handle 100 is used with a digging-type tool, it will be used in a substantially the same manner as was described above for the handle 30 of FIGS. 1–3 and, if used with a pulling-type tool, will be used in substantially the same manner as was described above for the tool of FIGS. 5–7.

From the foregoing, it can be seen that there have been provided improved garden tools and ergonomic handles therefor which are of relatively simple and economical construction, providing ergonomic shape and good frictional grip, while accommodating flexing of one part of the handle relative to another without impairing the overall strength and rigidity of the handle.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

We claim:

1. A tool handle comprising:
   an elongated core body having a working end for connection to an associated tool head and a distal end and adopted to be grasped in use by a user and anywhere between the working end and the distal end,
   the core body having a cavity formed therein and spaced longitudinally from the working end and dividing the core body into first and second portions, and
   a flexible and resilient body formed of a relatively soft material filling the cavity and secured to the core body for accommodating flexing of the first portion relative to the second portion.

2. The tool handle of claim 1, wherein the core body has upper and lower sides extending between the ends.

3. The tool handle of claim 2, wherein the cavity is disposed adjacent to the distal end of the core body.

4. The tool handle of claim 3, wherein the cavity is in the form of a notch.

5. The tool handle of claim 4, wherein the cavity is formed in the lower side of the body.

6. The tool handle of claim 3, wherein the cavity is in the form of an aperture extending laterally through the handle.

7. The tool handle of claim 6, wherein the aperture is generally hourglass-shaped in transverse cross section.

8. The tool handle of claim 2, wherein the cavity is formed adjacent to the working end of the core body.

9. The tool handle of claim 8, wherein the cavity is in the form of a notch.

10. The tool handle of claim 9, wherein the notch is formed in the upper side of the core body.

11. The tool handle of claim 8, wherein the cavity includes notches which open respectively at the upper and lower sides of the core body.

12. The tool handle of claim 11, wherein the core body includes a hinge interconnecting the first and second portions and defining the notches.

13. The tool handle of claim 1, wherein the core body is formed of a plastic material.

14. A tool handle comprising:
    a core body having a cavity formed therein and dividing the core body into first and second portions,
    a flexible and resilient body formed of a relatively soft material filling the cavity and secured to the core body for accommodating flexing of the first portion relative to the second portion, and
    a grip sheath covering the core body except for the cavity.

15. The tool handle of claim 14, wherein the cavity is in the form of a notch.

16. The tool handle of claim 15, wherein the core body includes a lip extending laterally outwardly therefrom around the periphery of the notch and separating the flexible and resilient body from the sheath.

17. The tool handle of claim 15, wherein the core body has a recess formed therein in a side thereof opposite the notch for cooperation with the notch to define therebetween a relatively thin hinge.

18. The tool handle of claim 17, wherein the sheath fills the recess.

19. The tool handle of claim 14, wherein the sheath is formed of a flexible and resilient material.

20. A garden tool comprising:

a work-engaging head;

a shank integral with and extending from the head; and a handle connected to the shank, the handle including a core body having a cavity formed therein and dividing the core body into first and second portions, and a flexible and resilient body formed of a relatively soft material filling the cavity and secured to the core body for accommodating flexing of the first portion relative to the second portion.

21. The garden tool of claim 20, wherein the core body has a working end with a bore formed therein, an end of the shank being received in the bore and fixedly secured to the core body.

22. The garden tool of claim 21, wherein the shank is generally cylindrical in shape.

23. The garden tool of claim 22, wherein the shank is hollow.

24. The garden tool of claim 22, wherein the shank is solid.

25. The garden tool of claim 20, wherein the cavity includes a notch formed in a lower side of the core body adjacent to a distal end thereof.

26. The garden tool of claim 25, wherein the head is a trowel.

27. The garden tool of claim 20, wherein the cavity includes a notch formed in an upper side of the core body adjacent to a working end thereof.

28. The garden tool of claim 27, wherein the head is a plow.

29. The garden tool of claim 20, wherein the cavity includes an aperture extending laterally through the handle.

30. The garden tool of claim 20, wherein the cavity includes notches respectively formed in upper and lower sides of the core body.

31. The garden tool of claim 20, wherein the head includes a sharp-edged notch.

32. The garden tool of claim 20, wherein the head includes a serrated cutting edge.

33. The garden tool of claim 20, and further comprising a flexible and resilient sheath covering the core body except for the cavity.

34. An ergonomic hand tool handle comprising:

an elongated body having a working end adapted to be connected to an associated tool and a distal end and a convexly curved upper surface extending from the working end to the distal end, the body having first and second thin portions respectively at the working and distal ends and a third thin portion approximately midway between the ends, the body have a forward thick portion between the first and third thin portions and a rearward thick portion between the second and third thin portions, the thickness of the body gradually decreasing from the forward thick portion to each of the first and third thin portions and from the rearward thick portion to each of the second and third thin portions, the thick portions being spaced apart a distance substantially greater than the distance from either thick portion to an adjacent end of the body.

35. The tool handle of claim 34, wherein the body has a hole formed therethrough.

36. The tool handle of claim 35, and further comprising a grip sheath covering the core body except for the hole.

* * * * *